(12) United States Patent
Ni et al.

(10) Patent No.: US 11,606,393 B2
(45) Date of Patent: *Mar. 14, 2023

(54) NODE CLASSIFICATION IN DYNAMIC NETWORKS USING GRAPH FACTORIZATION

(71) Applicant: NEC Laboratories America, Inc., Princeton, NJ (US)

(72) Inventors: Jingchao Ni, Princeton, NJ (US); Haifeng Chen, West Windsor, NJ (US); Bo Zong, West Windsor, NJ (US); LuAn Tang, Pennington, NJ (US); Wei Cheng, Princeton Junction, NJ (US)

(73) Assignee: NEC Corporation

( * ) Notice: Subject to any disclaimer, the term of this patent is extended or adjusted under 35 U.S.C. 154(b) by 259 days.

This patent is subject to a terminal disclaimer.

(21) Appl. No.: 17/004,547

(22) Filed: Aug. 27, 2020

(65) Prior Publication Data

US 2021/0067558 A1 Mar. 4, 2021

Related U.S. Application Data

(60) Provisional application No. 62/893,254, filed on Aug. 29, 2019.

(51) Int. Cl.
*H04L 9/40* (2022.01)
*G06N 3/049* (2023.01)
(Continued)

(52) U.S. Cl.
CPC ............. *H04L 63/20* (2013.01); *G06N 3/049* (2013.01); *H04L 63/1425* (2013.01); *G06N 3/08* (2013.01); *H04L 41/16* (2013.01)

(58) Field of Classification Search
CPC ........ G06N 3/0445; G06N 3/049; G06N 3/08; G06N 3/084; G06N 5/02; G06N 7/005;
(Continued)

(56) References Cited

U.S. PATENT DOCUMENTS

2006/0271661 A1* 11/2006 Qi ..................... H04L 67/125
709/223
2011/0213801 A1* 9/2011 He ..................... G06F 16/9024
707/E17.017

(Continued)

OTHER PUBLICATIONS

Defferrard et al. "Convolutional Neural Networks on Graphs with Fast Localized Spectral Filtering", 30th Conference on Neural Information Processing Systems (NIPS 2016). Dec. 5, 2016. pp. 1-9.

(Continued)

*Primary Examiner* — Gil H. Lee
(74) *Attorney, Agent, or Firm* — Joseph Kolodka (57) ABSTRACT

Methods and systems for detecting and responding to anomalous nodes in a network include inferring temporal factors, using a computer-implemented neural network, that represent changes in a network graph across time steps, with a temporal factor for each time step depending on a temporal factor for a previous time step. An invariant factor is inferred that represents information about the network graph that does not change across the time steps. The temporal factors and the invariant factor are combined into a combined temporal-invariant representation. It is determined that an unlabeled node is anomalous, based on the combined temporal-invariant representation. A security action is performed responsive to the determination that unlabeled node is anomalous.

18 Claims, 8 Drawing Sheets

(51) Int. Cl.
*H04L 41/16* (2022.01)
*G06N 3/08* (2023.01)
(58) Field of Classification Search
CPC ....... H04L 41/12; H04L 41/14; H04L 41/149; H04L 41/16; H04L 41/22; H04L 63/1425; H04L 63/20
See application file for complete search history.

(56) References Cited

U.S. PATENT DOCUMENTS

| | | | | |
|---|---|---|---|---|
| 2014/0208287 | A1* | 7/2014 | Zhou | G06F 30/20 716/136 |
| 2014/0258196 | A1* | 9/2014 | Dhurandhar | G06N 7/00 706/20 |
| 2020/0074246 | A1* | 3/2020 | Goyal | G06K 9/6274 |
| 2020/0366690 | A1* | 11/2020 | Cheng | H04L 63/1416 |

OTHER PUBLICATIONS

Du et al., "Dynamic Network Embedding: An Extended Approach for Skip-gram based Network Embedding", Proceedings of the Twenty-Seventh International Joint Conference on Artificial Intelligence (IJCAI 2018). Jul. 13-19, 2018. pp. 2086-2092.
Goyal et al., "DynGEM: Deep Embedding Method for Dynamic Graphs", arXiv:1805.11273v1 [cs.SI]. May 29, 2018. pp. 1-8.
Goyal et al., "dyngraph2vec: Capturing Network Dynamics using Dynamic Graph Representation Learning", arXiv:1809.02657V2 [cs.SI]. Jul. 2, 2019.
Grover et al., "node2vec: Scalable Feature Learning for Networks", Proceedings of the 22nd International Conference on Knowledge Discovery and Data Mining. ACM SIGKDD 2016. Aug. 13-17, 2016. pp. 855-864.
Hamilton et al., "Inductive Representation Learning on Large Graphs", 31st Conference on Neural Information Processing Systems (NIPS 2017). Dec. 4-9, 2017. pp. 1-11.
Kipf et al., "Semi-Supervised Classification With Graph Convolutional Networks", Published conference pater at the International Conference on Learning Representations (ICLR 2017). Apr. 24-26, 2017. pp. 1-14.
Li et al., "Streaming Link Prediction on Dynamic A!ributed Networks", Technical Presentation at Web Services Distributed Management Conference (WSDM 2018). Feb. 5-9, 2018. pp. 369-377.
Mikolov et al., "Efficient Estimation of Word Representations in Vector Space", arXiv:1301.3781v3 [cs.CL]. Sep. 7, 2013. pp. 1-12.
Niepert et al., "Learning Convolutional Neural Networks for Graphs", Proceedings of the 33rd International Conference on Machine Learning. vol. 48. Jun. 19-24, 2016. pp. 1-10.
Perozzi et al., "DeepWalk: Online Learning of Social Representations", 26th International Conference on Knowledge Discovery and Data Mining. ACM SIGKDD 2014. Aug. 24-27, 2014. pp. 701-710.
Tang et al. "Line: Large-scale Information Network Embedding", Proceedings from the World Wide Web Conference (WWW 2015). May 18-22, 2015. pp. 1067-1077.
Velickovic et al.. "Graph Attention Networks" Published as a conference paper at the Sixth International Conference on Learning Representations (ICLR 2018). Apr. 30-May 3, 2019. pp. 1-12.
Xu et al., "Spatio-Temporal Attentive RNN for Node Classification in Temporal Attributed Graphs", Proceedings of the 28th International Joint Conference on Artificial Intelligence (IJCAI 2019). Aug. 10-16, 2019. pp. 3947-3953.
Zemel et al., "Gated Graph Sequence Neural Networks", Published as a conference paper at the International Conference on Learning Representations (ICLR 2016). arXiv:1511.05493v4 [cs.LG]. Sep. 22, 2017. pp. 1-20.
Zhou et al., "Dynamic Network Embedding by Modeling Triadic Closure Process", The 32nd AAAI Conference on Artificial Intelligence (AAAI 2018). Feb. 2-7, 2018. pp. 571-578.
Zhuang et al., "Dual Graph Convolutional Networks for Graph-Based Semi-Supervised Classification", Proceedings from the World Wide Web Conference (WWW 2018). Apr. 23-27, 2018. pp. 499-508.

* cited by examiner

NODE CLASSIFICATION IN DYNAMIC NETWORKS USING GRAPH FACTORIZATION

RELATED APPLICATION INFORMATION

This application claims priority to U.S. Patent Application No. 62/893,254, filed on Aug. 29, 2019, incorporated herein by reference herein its entirety.

BACKGROUND

Technical Field

The present invention relates to node classification, and, more particularly, to capturing the evolutionary patterns encoded by changing relationships and attributes in a dynamic network.

Description of the Related Art

The problem of classifying nodes in a dynamic network, node relationships and attributes can change over time, is challenging. Most existing approaches focus on static networks, and are unable to address networks that change over time, or cannot model the latent consistency in attributed temporal graphs. There are complex dynamics in the evolution of networks, as the temporal and spatial dimensions are entangled.

SUMMARY

A method for detecting and responding to anomalous nodes in a network includes inferring temporal factors, using a computer-implemented neural network, that represent changes in a network graph across time steps, with a temporal factor for each time step depending on a temporal factor for a previous time step. An invariant factor is inferred that represents information about the network graph that does not change across the time steps. The temporal factors and the invariant factor are combined into a combined temporal-invariant representation. It is determined that an unlabeled node is anomalous, based on the combined temporal-invariant representation. A security action is performed responsive to the determination that unlabeled node is anomalous.

A system for detecting and responding to anomalous nodes in a network includes a hardware processor and a memory. The memory is configured to store a temporal graph factorization network that is executed by the processor. The temporal graph factorization network is configured to infer temporal factors that represent changes in a network graph across a plurality of time steps, with a temporal factor for each time step depending on a temporal factor for a previous time step, to infer an invariant factor that represents information about the network graph that does not change across the plurality of time steps, to combine the temporal factors and the invariant factor into a combined temporal-invariant representation, and to determine that an unlabeled node is anomalous, based on the combined temporal-invariant representation. A security console is configured to perform a security action responsive to the determination that unlabeled node is anomalous.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention perform node classification, for example using attributed temporal graphs, to learn effective node embeddings that can fully capture the evolutionary patterns encoded by changing node relationships and attributes. A temporal graph factorization network (TGFN) is used as a latent factor model, to factorize dynamic node embeddings into two types of latent factors: a time-invariant factor that absorbs long-term consistency in the attributed temporal graph, and a sequence of temporal factors that capture node evolution. The sequence of temporal factors can use, for example, a deep Markovian model.

The distributions of all latent factors can be parameterized and inferred by a well-structured variational inference network. TGFN can reduce model complexity by specifically modeling the latent factors of node embeddings. In this manner, TGFN can generalize to scare training data, while achieving reasonable performance.

Figure 1:
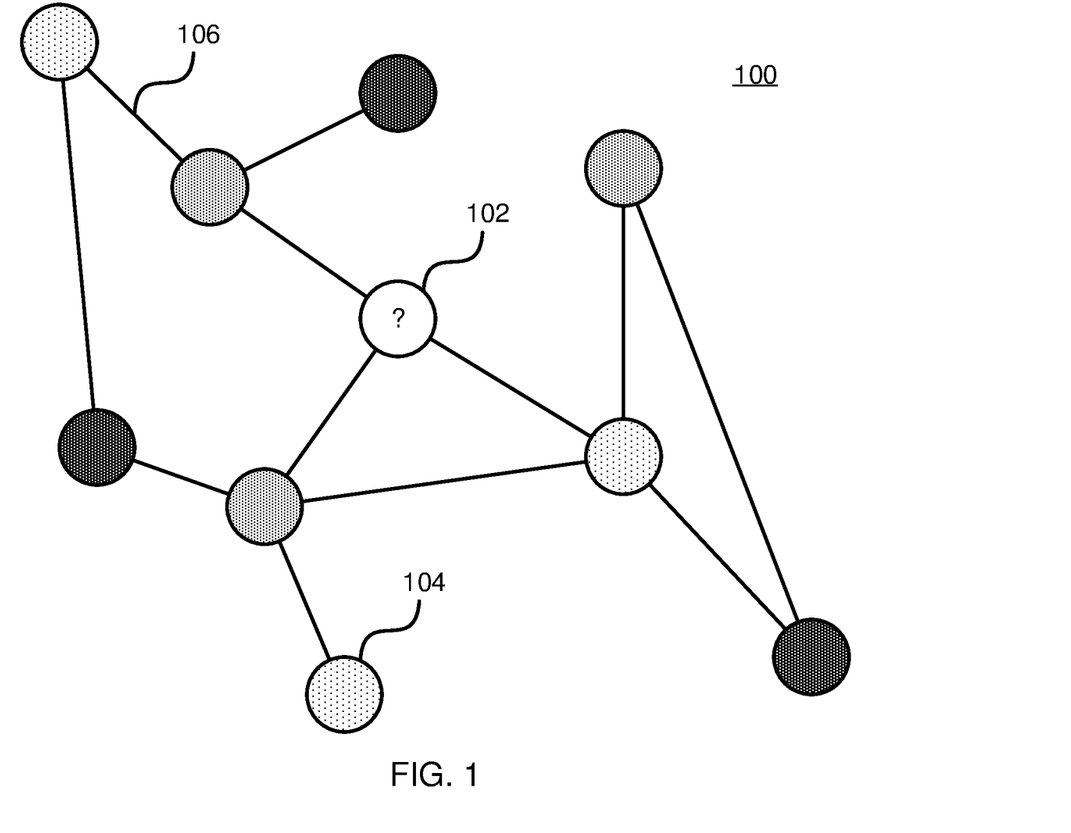
FIG. 1 is a diagram of a network graph that includes labeled and unlabeled nodes, in accordance with an embodiment of the present invention.

Referring now in detail to the figures in which like numerals represent the same or similar elements and initially to FIG. 1, an exemplary network graph 100 is illustratively depicted in accordance with one embodiment of the present invention. The graph 100 captures the topological structure of a dynamic network of objects, represented as nodes 104. As noted above, in some embodiments, such objects may represent physical objects in, e.g., a physical system. In some embodiments, the objects 104 may represent atoms or ions in a molecule. In yet other embodiments, the objects 104 may represent computing systems within a communications network. It should be understood that the illustrated graph is intended to be purely illustrative, and that the structure shown therein is not intended to be limiting in any way.

Edges 106 between the nodes 104 represent connections between the objects. For example, they may represent a chemical bond between two atoms, a structural connection between two physical objects, or a network communication between two computer systems. These connections develop and change over time, such that an edge 106 between two nodes 104 may disappear from one measurement to the next, while a new edge 106 may be formed between two different nodes 106 in the same interval.

Each node 104 in the network 100 includes one or more attributes or labels. These labels identify some characteristic of the node 104. For example, in a complex molecule, individual atoms and ions may be labeled as contributing to a pharmacological effect of the molecule, with some nodes 104 being labeled as contributing, and other nodes 104 being labeled as not contributing. In a computer network environment, the nodes 104 may be labeled according to roles within the network (e.g., server vs workstation), or according to conformance to expected behavior (e.g., normal vs anomalous). The labels may include, for example, an attribute vector, denoting multiple attributes of the node respective 104.

An initial set of edges 106 may be provided, for example in the form of a physical record, or may be inferred by pairwise regression of output data from pairs of objects 104. Edges 106 can be weighted or unweighted, directed or undirected. However, label and edge information may not be available for every node 104 and for every attribute of every node 104. Thus, some nodes 102 may be partially or entirely unlabeled at the outset.

The present embodiments identify the importance of different factors, such as neighboring nodes 104, attributes, and topology, that influence the labels of a node. Topology and attribute information is adaptively selected for integration over the evolution of the graph 100 through time.

Given a sequence of attributed graphs 100 for a set of nodes 104, where each node 104 has a unique class label over a period of time, the present embodiments predict the labels of unlabeled nodes 102 by learning from the labeled ones. In some embodiments, this can be used to detect anomalous network traffic. Given a network's historical records, a sequence of communication graphs can be constructed, where each node is a computational device and each edge indicates a communication. Each node can be associated with characteristic features, such as a network address (e.g., an IP address or MAC address) and a device type. The present embodiments can then classify the nodes into an anomalous class and a normal class, using the labeled historical data. The labeled network graph can then be used to identify anomalous behavior that may, for example, be indicative of a network failure or intrusion. The anomalous behavior can then be corrected.

In another application, brain graphs can be built to show the functional connectivity of widespread brain regions, by statistical analysis of fMRI and other signals. In a brain graph, each node indicates a particular region and each edge represents functional connectivity between two regions. To monitor the activity of the brain, a sequence of brain graphs can be constructed. In this context, node classification can be used to assign each node to a category of activity, such as language processing or sports. The brain graph can then be used to identify abnormalities in brain function, in preparation for surgery or treatment.

Figure 2:
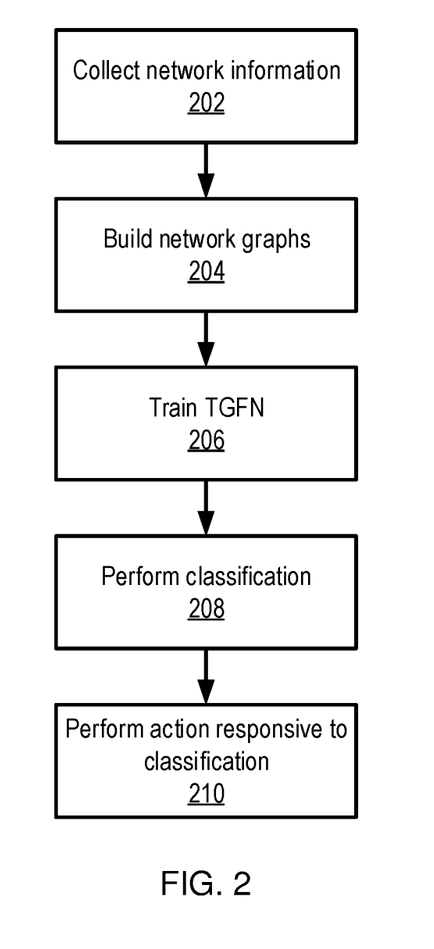
FIG. 2 is a block/flow diagram of a method of detecting and responding to anomalous activity within a network, in accordance with an embodiment of the present invention.

Referring now to FIG. 2, a method of performing network classification, and taking an action responsive to that classification, is shown. Block 202 collects network information, including identifying available labels of the individual nodes 104 and identifying relationships between the nodes 104. Using this information, block 204 builds a series of network graphs 100 that characterize the underlying network as it changes over time. Thus, for each time step t, block 204 builds a graph $G_t$ that represents the known node labels and relationships at that time.

Block 206 trains the TGFN, which is described in greater detail below. Training the TGFN 206 can be performed offline, prior to the analysis of a particular network. Alternatively, the TGFN can be trained parallel to the classification of the nodes in the network.

Block 208 uses the trained TGFN to perform classification for any unlabeled nodes 102 within the network 100. These unlabeled nodes 102 are assigned labels across the evolution of the network 100 in time. Thus, for example, a particular node can be identified as being "anomalous." Block 210 takes an action, based on the classification. In the example of identifying anomalous devices on a computer network, the action may include a security action that responds to anomalous activity. For example, the security action may include, e.g., shutting down devices, stopping or restricting certain types of network communication, raising alerts to system administrators, changing a security policy level, and so forth. The security action can include issuing commands to the other computer systems on the network.

Figure 3:
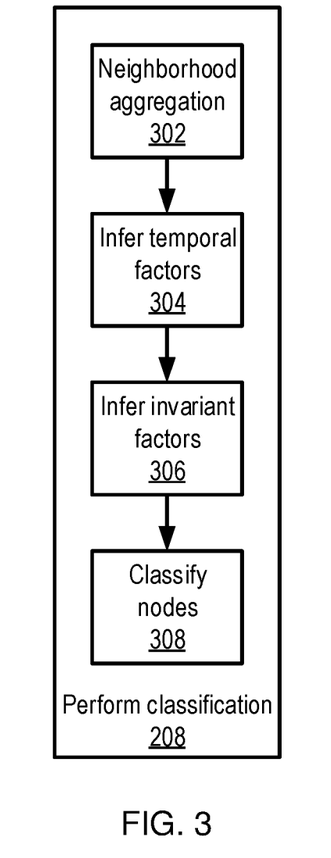
FIG. 3 is a block/flow diagram of a method for classifying an unlabeled node in a network graph, in accordance with an embodiment of the present invention.

Referring now to FIG. 3, additional information is provided regarding the classification of block 208. Block 302 performs neighborhood aggregation. At each time step t, a set of aggregator functions learns to aggregate feature information for each node's local neighborhood. For example, k-hop neighbors can be used to account for each node in a graph at t. This is performed across all time steps.

Given a batch of nodes $\mathcal{B}^0$ to be classified, and a graph snapshot $G_t$, for each node i in $\mathcal{B}^0$, the features of i's neighbors are aggregated, up to k hops from i in $G_t$, for encoding local information. The k-hop neighbor batches are sampled for the nodes in $\mathcal{B}^0$. First, the direct neighbors of each node i in $\mathcal{B}^0$ in G are sampled by a sampling function Nb(i). The sampled neighbors, together with the nodes in $\mathcal{B}^0$, form a new set $\mathcal{B}^1$. The same procedure is performed on $\mathcal{B}^1$ to obtain $\mathcal{B}^2$, and is iteratively repeated until $\mathcal{B}^k$ is obtained, which is a batch of all nodes within k hops of node i in G.

The sampling function Nb(i) can be any appropriate sampling function, but it is specifically contemplated that the sampling function may be a uniform sampling with a user-defined sample size S. Thus, Nb(i) may sample S neighbors of a node with equal probability.

Based on the node batches for each graph snapshot, an embedding vector $x_i$ can be generated for each node I in the target batch $\mathcal{B}^0$. For each node i in the last batch $\mathcal{B}^k$, $x_i$ is initialized by the input feature of node i. Then, for each node i in $\mathcal{B}^{\kappa-1}$, where $\kappa = k-1$, the following steps can be applied:

$$\tilde{x}_i = \text{NAGG}_\kappa(\{x_j, \forall j \in Nb(j)\})$$

$$x_i^{new} = \text{ReLU}(\text{MLP}_\kappa([x_i; \tilde{x}_i]))$$

where $\text{NAGG}_\kappa(\bullet)$ is a neighbor-based aggregation function at the $\kappa^{th}$ layer (e.g., a max pooling over vectors $x_j$), $\text{MLP}_\kappa(\bullet)$ is a multi-layer perceptron at the $\kappa^{th}$ layer, and $[\bullet;\bullet]$ is a concatenation operator. These steps are applied iteratively until $\kappa$ decreases to zero, when the final embedding $x_i$, encoding the k-hop neighbors in graph G, is obtained. The same procedure is performed over all time steps, for each node i in $\mathcal{B}^0$, and a sequence of node embeddings for node I from time 1 to T can then be obtained.

To infer latent temporal factors in block 304, a deep Markovian model can be used. Each temporal factor is conditioned on observation of the time-invariant factor at its current time step and the temporal factor at its previous time step, in accordance with Markov properties.

Block 304 therefore models the distribution $p(z_i^t|x_i^t, z_i^{t-1})$, where $z_i^t$ is the temporal factor of node i at time t, and $x_i^t$ is an observation of the time-invariant factor $z_i^c$. In some embodiments, the distribution can be modeled using recurrent neural networks (RNNs). RNNs are particularly appropriate, because the statistical dependency of $z_i^t$ on $x_i^t$ and $z_i^{t-1}$ inherently has a recurrent structure. A gated recurrent unit (GRU) can be used in particular, formulated by:

$$\tilde{h}_i^t = GRU_{\phi_{\tilde{h}}}(x_i^t, \tilde{h}_i^{t-1}) \in \mathbb{R}^{d_{ht} \times 1}$$

where $\tilde{h}_i^t (0 < t \leq T)$ is the hidden state at time step t, $d_{ht}$ is the dimensionality, and $\phi_{\tilde{h}}$ represents the parameters of the GRU.

To encode the latent temporal factor $z_i^t$ in the Markovian manner, a transition function is used to integrate $z_i^t$ and $\tilde{h}_i^t$ to form a single hidden representation $h_i^t$ as follows:

$$h_i^t = 0.5[\tanh(MLP_{\phi_h}(z_i^{t-1})) + \tilde{h}_i^t] \in \mathbb{R}^{d_{ht} \times 1}$$

where $\phi_h$ is the parameter of the MLP. A simple weighting can be used to integrate the components from $z_i^t$ and $\tilde{h}_i^t$.

After obtaining the hidden representation $h_i^t$, a diagonal Gaussian distribution is used for modeling the distribution $p(z_i^t|x_i^t, z_i^{t-1})$ as follows:

$$p(z_i^t|x_i^t, z_i^{t-1}) = \mathcal{N}(\mu_i^t, \text{diag}((\sigma_i^t)^2))$$

where $\mu_i^t = MLP_{\phi_\mu}(h_i^t) \in \mathbb{R}^{d_\sigma \times 1}$, where $\log(\sigma_i^t)^2 = MLP_{\phi_\sigma}(h_i^t) \in \mathbb{R}^{d_\sigma \times 1}$, and where $\phi_\mu$ and $\phi_\sigma$ are parameters of the MLPs. The model parameter $\phi$ in the inference network for the temporal factor is then determined as $\phi = \{\phi_{\tilde{h}}, \phi_h, \phi_\mu, \phi_\sigma\}$.

Block 306 determines the time-invariant factor $z_i^c$, which is conditioned on features of all time points in the graph, and captures the information that stays consistent over time. To encode the information in all node embeddings $x_i^1, \ldots, x_i^T$, a neural network can be used to learn the hidden representation $h_i^c$ as:

$$h_i^c = \tanh(MLP_{\theta_h}([x_i^1; \ldots; x_i^T])) \in \mathbb{R}^{d_{hc} \times 1}$$

where $d_{hc}$ is the dimensionality of $h_i^c$, and $\theta_h$ is the parameter of the MLP. Based on the hidden representation $h_i^c$, a diagonal Gaussian can be used to model the distribution $p(z_i^c|\{x_i^t\})$ as follows:

$$p_\theta(z_i^c|\{x_i^t\}) = \mathcal{N}(\mu_i^c, \text{diag}((\sigma_i^c)^2))$$

where $\mathcal{N}$ is a gaussian distribution having a mean $\mu_i^c = MLP_{\theta_\mu}(h_i^c) \in \mathbb{R}^{d_{zc} \times 1}$ and a variance $\text{diag}((\sigma_i^c)^2)$, where $\log(\sigma_i^c)^2 = MLP_{74_\sigma}(h_i^c) \in \mathbb{R}^{d_{zc} \times 1}$, where $\theta_\mu$ and $\theta_\sigma$ represent the parameters of the MLPs, and where $\text{diag}((\sigma_i^c)^2)$ represents a diagonal matrix, with $(\sigma_i^c)^2$ on its diagonal. Following the above, the logarithm of $(\sigma_i^c)^2$ is modeled, rather than $(\sigma_i^c)^2$ itself, to avoid a non-negative constraint. As a result, the model parameter $\theta$ in the inference network for the time invariant factor is $\theta = \{\theta_h, \theta_\mu, \theta_\sigma\}$.

Block 308 classifies unlabeled nodes 102, using a decoder function that predicts the distribution of the class label $y_i$ for each node I, based on its latent factors $z_i^c$ and $z_i^1, \ldots, z_i^T$.

Given the sequence $z_i^1, \ldots, z_i^T$, the amount of valuable information present differs from one time step to the next. It is likely that only a few sub-sequences contain the most discriminative information for determining the node labels. For example, in a sequence of brain graphs, where each node represents a small cube of brain tissue, the times when a subject is speaking will be more important than other periods of time to determining which nodes are related to language processing. As a result, the present embodiments can use an attentive temporal aggregator to automatically assign different levels of attention to different sub-sequences. The attention value $\alpha_i^t$, for each node i, at each time step t, can be expressed as:

$$\alpha_i^t = \frac{e^{w^T \tanh V z_i^t}}{\sum_{\tau=1}^{T} e^{w^T \tanh V z_i^\tau}}$$

where V and w are parameters and $\tau$ is the transpose operator.

The attention for a specific node i across all time steps can be expressed as $\alpha_i = [\alpha_i^1, \ldots, \alpha_i^T]$. Extending the attentive mechanism to include multiple nodes helps to stabilize the learning process, and benefits the exploration of multiple sub-spaces. As a result, multiple sub-sequences together may describe the overall pattern. Therefore, if $Z_i = [z_i^1; \ldots; z_i^T]$ represents the temporal factors for a given node, the attentive temporal aggregator is expressed as:

$$h_i^{tpr} = [Z_i(\alpha_i^1)^\tau; \ldots; Z_i(\alpha_i^M)^\tau] \in \mathbb{R}^{Md_z \times 1}$$

where $\alpha_i^m$ represents the attention of the $m^{th}$ attention head $(1 \leq m \leq M)$, and M is the total number of heads in the aggregator.

The aggregated temporal representation $h_i^{tpr}$ and the time-invariant factor $z_i^c$ are combined into a single representation:

$$h_i^{out} = \tanh(MLP_{\varphi_h}([h_i^{tpr}; z_i^c])) \in \mathbb{R}$$

where $\varphi_h$ is the parameter of the MLP. In practice, a dropout layer can also be applied to the concatenated vector $[h_i^{tpr}; z_i^c]$, to improve robustness.

The label $y_i$ can be drawn from a categorical distribution $p(y_i|\{z_i^t\}, z_i^c)$, which is represented by $p(y_i|\{z_i^t\}, z_i^c) = \text{Categorical}(q_i)$, where $q_i = \text{softmax}(MLP_{\varphi_y}(h_i^{out})) \in \mathbb{R}^{L \times 1}$. In this expression, $\varphi_y$ is the parameter of the MLP, and L is the number of classes to be assigned to node i. The model parameter of the classification network is then $\varphi = \{w, V, \varphi_h, \varphi_y\}$. The categorical distribution Categorical($q_i$) may be defined as the probability function $f(y|q) = \prod_{j=1}^{L} q_j^{[y=j]}$, where $[y=j]$ evaluates to 1 if y=j, and is zero otherwise. With this probability function, labels y can be drawn as classes j with probability $q_j$.

Looking back to block 206, where the TGFN is trained, Y represents a label matrix, with $Y_{ij}$ being assigned to a predetermined value (e.g., 1) if node i belongs to class j, and being assigned to a 0 otherwise. Q represents a matrix with rows $q_i$, which are described in greater detail below with respect to the classification of nodes. The loss function for training the TGFN model can be expressed as:

$$\ell_c = \sum_{i \in v_L} \sum_{j=1}^{L} Y_{ij} \log Q_{ij}$$

where $l_c$ is the cross-entropy error over all labeled nodes, L is the number of classes for a node, and $v_L$ is a subset of nodes whose labels are known and which can be accessed during model training.

To encourage multiple attention heads to diverge from one another, a regularization term can be used: $\ell_a = \|A_i A_i^\tau - I\|^2$, where $A_i = [(\alpha_i^1)^\tau; \ldots; (\alpha_i^M)^\tau]^\tau$ and where I is the identity matrix. The final loss function for training the model then becomes $\ell = \ell_c + \lambda \ell_a$, where $\lambda$ is a trade-off parameter. By optimizing the loss function on training data, the parameters of a neural network can be learned, and the entire model can be trained for maximum predictive power. The trained model can make predictions on node labels for new nodes in new graphs that have not been observed during training.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 4:
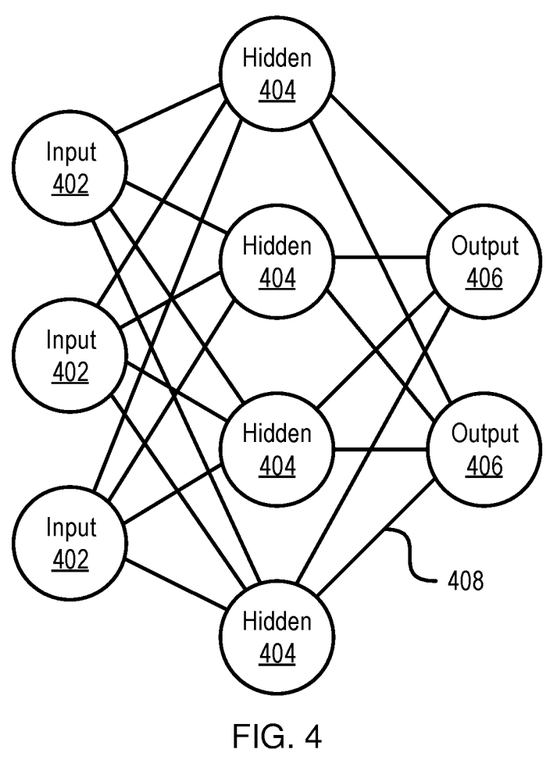
FIG. 4 is a diagram of an exemplary high-level neural network architecture, in accordance with an embodiment of the present invention.

Referring now to FIG. 4, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 402 that provide information to one or more "hidden" neurons 404. Connections 408 between the input neurons 402 and hidden neurons 404 are weighted and these weighted inputs are then processed by the hidden neurons 404 according to some function in the hidden neurons 404, with weighted connections 408 between the layers. There may be any number of layers of hidden neurons 404, and as well as neurons that perform different functions. There exist different neural network structures as well, such as convolutional neural network, maxout network, etc. Finally, a set of output neurons 406 accepts and processes weighted input from the last set of hidden neurons 404.

This represents a "feed-forward" computation, where information propagates from input neurons 402 to the output neurons 406. Upon completion of a feed-forward computation, the output is compared to a desired output available from training data. The error relative to the training data is then processed in "feed-back" computation, where the hidden neurons 404 and input neurons 402 receive information regarding the error propagating backward from the output neurons 406. Once the backward error propagation has been completed, weight updates are performed, with the weighted connections 408 being updated to account for the received error. This represents just one variety of ANN.

Figure 5:
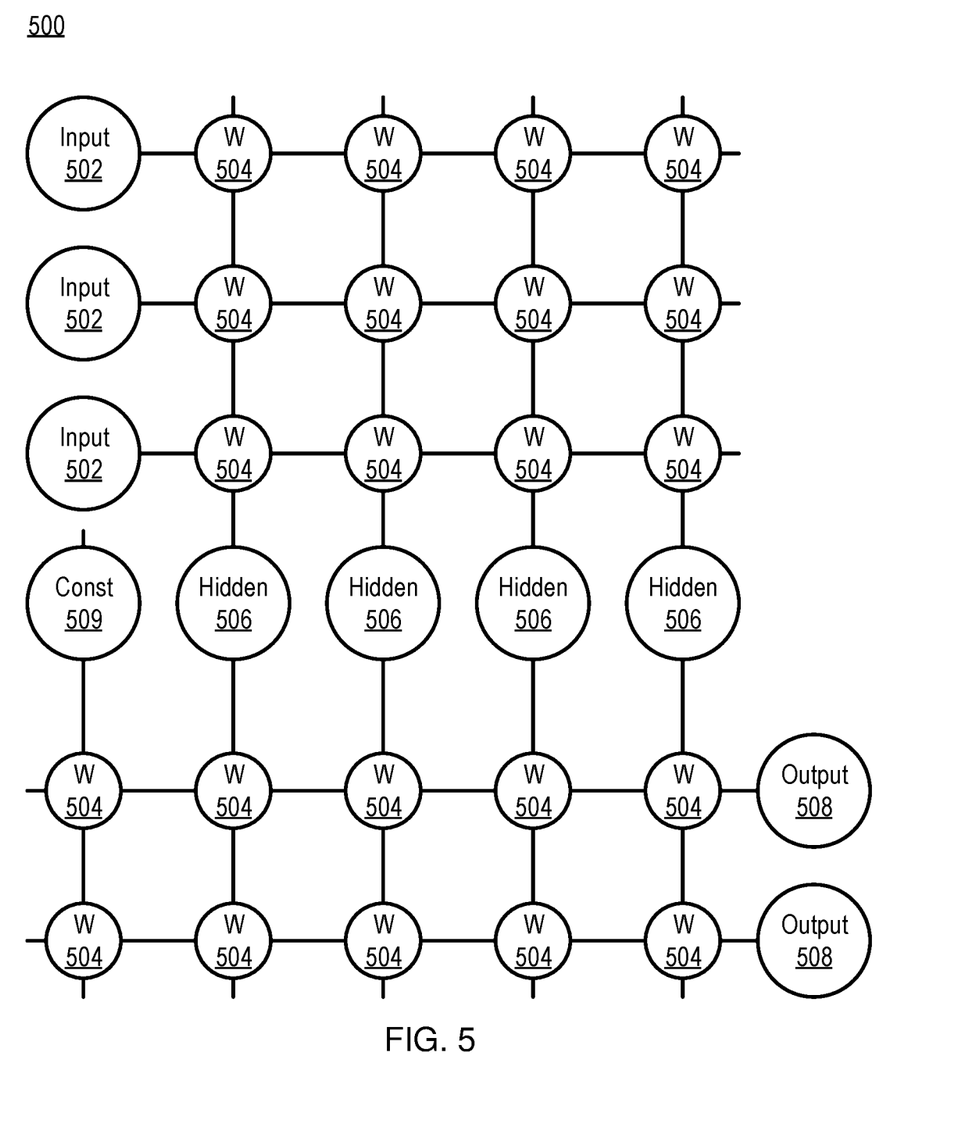
FIG. 5 is a diagram of a neural network architecture that shows the weighted connections between layers, in accordance with an embodiment of the present invention.

Referring now to FIG. 5, an exemplary ANN architecture 500 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 502 each provide an input signal in parallel to a respective row of weights 504. The weights 504 each have a respective settable value, such that a weight output passes from the weight 504 to a respective hidden neuron 506 to represent the weighted input to the hidden neuron 506. In software embodiments, the weights 504 may simply be represented as coefficient values that are multiplied against the relevant signals. The signals from each weight adds column-wise and flows to a hidden neuron 506.

The hidden neurons 506 use the signals from the array of weights 504 to perform some calculation. The hidden neurons 506 then output a signal of their own to another array of weights 504. This array performs in the same way, with a column of weights 504 receiving a signal from their respective hidden neuron 506 to produce a weighted signal output that adds row-wise and is provided to the output neuron 508.

It should be understood that any number of these stages may be implemented, by interposing additional layers of arrays and hidden neurons 506. It should also be noted that some neurons may be constant neurons 509, which provide a constant output to the array. The constant neurons 509 can be present among the input neurons 502 and/or hidden neurons 506 and are only used during feed-forward operation.

During back propagation, the output neurons 508 provide a signal back across the array of weights 504. The output layer compares the generated network response to training data and computes an error. The error signal can be made proportional to the error value. In this example, a row of weights 504 receives a signal from a respective output neuron 508 in parallel and produces an output which adds column-wise to provide an input to hidden neurons 506. The hidden neurons 506 combine the weighted feedback signal with a derivative of its feed-forward calculation and stores an error value before outputting a feedback signal to its respective column of weights 504. This back propagation travels through the entire network 500 until all hidden neurons 506 and the input neurons 502 have stored an error value.

During weight updates, the stored error values are used to update the settable values of the weights 504. In this manner the weights 504 can be trained to adapt the neural network 500 to errors in its processing. It should be noted that the three modes of operation, feed forward, back propagation, and weight update, do not overlap with one another.

Figure 6:
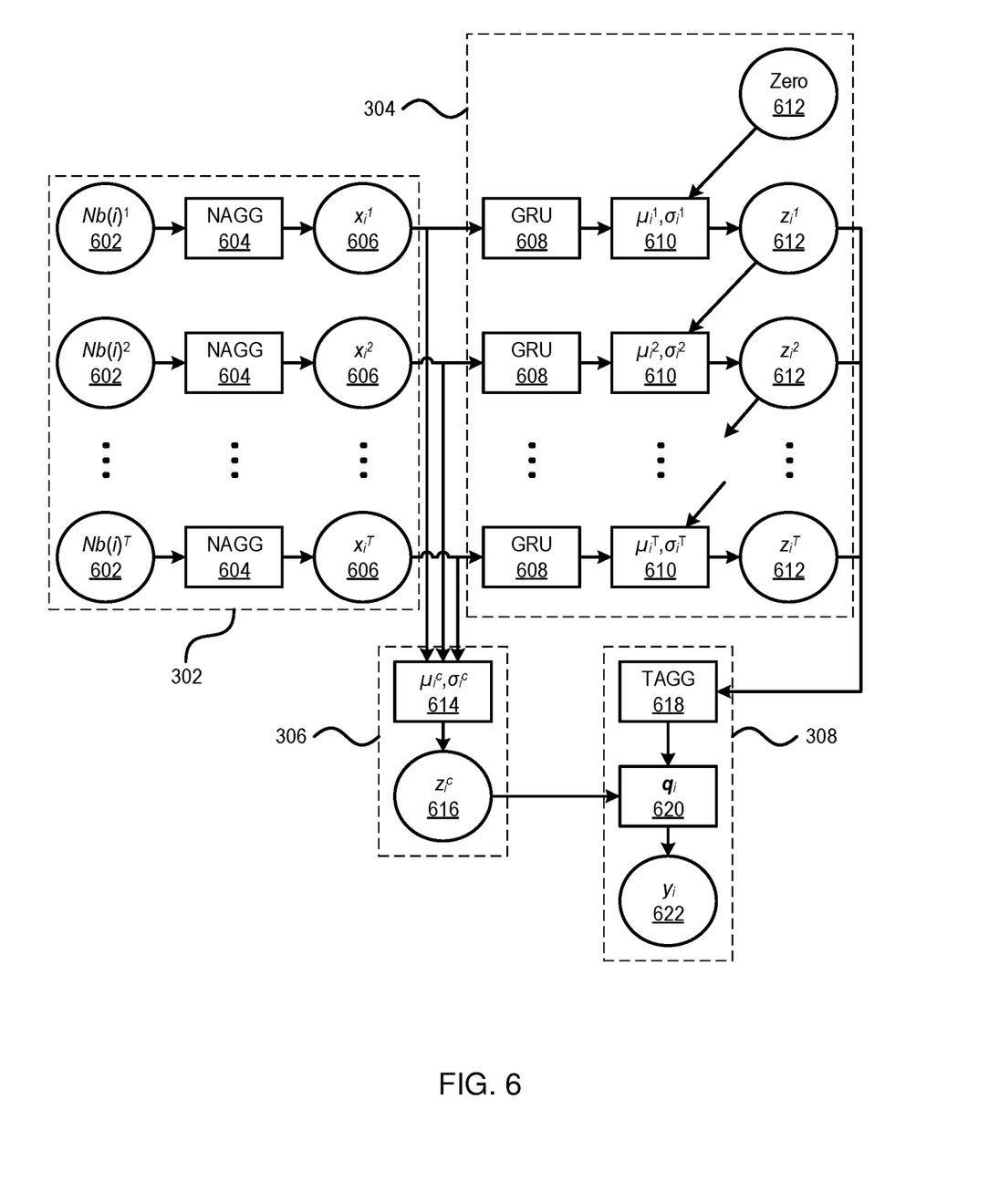
FIG. 6 is a block diagram of a temporal graph factorization neural network, which identifies a time-invariant factor and temporal factors, in accordance with an embodiment of the present invention.

Referring now to FIG. 6, a schematic of an exemplary TFGN is shown. The functions shown in FIG. 3 are generally shown in dashed boxes. Thus, neighborhood aggregation 302 begins with sampling function Nb(i)$^t$, sampling node i in each time step t in parallel. A neighborhood aggregation function 604 is used on each set of sampled neighbor nodes to produce respective embeddings $x_i^t$ of the k-hop neighbors of node i at each time step.

Temporal factor inference 304 can use these embeddings as the input to respective RNNs, shown as GRUs 608. The GRUs 608 generate a hidden state, which is used, in combination with a time factor $z_i^{t-1}$ from a previous time step to determine parameters 610 for modeling the temporal factors 612. At the first time step t=1, the previous time factor is considered to be zero.

The outputs of the neighborhood aggregation 302 are also used for inferring the invariant factors 616, with parameters 614 being determined to characterize the relevant MLPs.

The temporal factors 612 and the invariant factors 616 are both used as inputs to the classification network 308. The temporal factors 612 are fed to attentive temporal aggregator 618, which generates temporal representation $h_i^{tpr}$. This temporal representation is combined with the time-invariant factor 616 as an input to a categorical function 620. The categorical function produces a set of one or more labels 622 for each node i.

Figure 7:
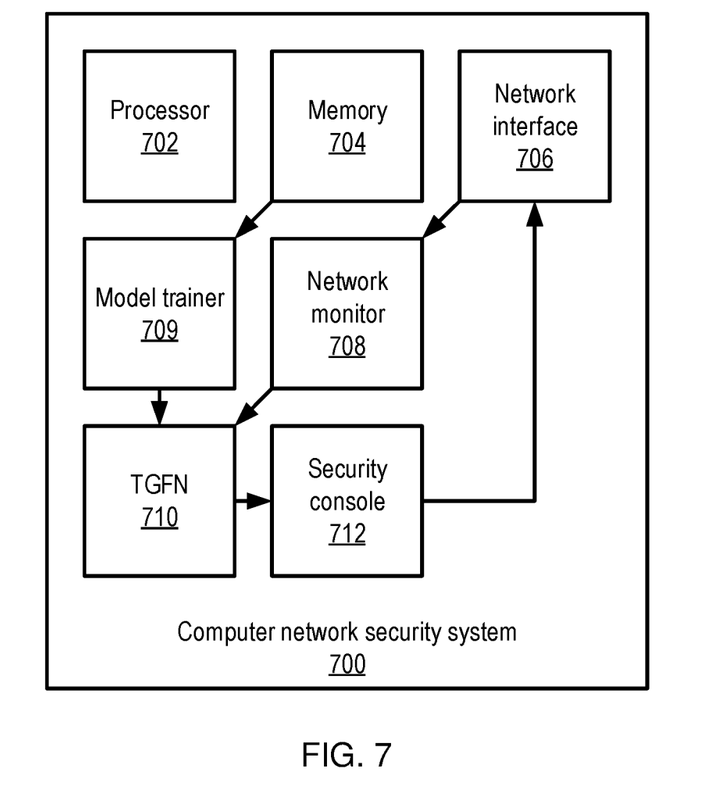
FIG. 7 is a block diagram of a computer network security system that identifies and responds to anomalous activity within a network, in accordance with an embodiment of the present invention.

Referring now to FIG. 7, a computer network security system 700 is shown. It should be understood that this system 700 represents just one application of the present principles, and that other uses for predicting the labels of nodes in a dynamic network are also contemplated. The system 700 includes a hardware processor 702 and a memory 704. A network interface 706 communicates with one or more other systems on a computer network by, e.g., any appropriate wired or wireless communication medium and protocol.

A TGFN 710 can be implemented as described above, with one or more discrete neural network configurations being implemented to provide classifications for unlabeled nodes in the network. In some embodiments, the nodes may represent computer systems on a computer network, with some of the identities and functions of the computer systems being known in advance, while other systems may be unknown. The TGFN 710 identifies labels for these unknown systems.

Network monitor 708 thus receives information from the network interface 706 regarding the state of the network. This information may include, for example, network log information that tracks physically connections between systems, as well as communications between systems. The network log information can be received in an ongoing manner from the network interface and can be processed by the network monitor to identify changes in network topology (both physical and logical) and to collect information relating to the behavior of the systems.

A model trainer 709 uses training data, stored in memory 704, to train the TGFN 710. In some embodiments, the TGFN 710 can identify systems in the network that are operating normally, and also systems that are operating anomalously. For example, a system that is infected with malware, or that is being used as an intrusion point, may operate in a manner that is anomalous. This change can be detected as the network evolves, making it possible to identify and respond to security threats within the network.

A security console 712 manages this process. The security console 712 reviews information provided by the TGFN 710, for example by identifying anomalous systems in the network, and triggers a security action in response. For example, the security console 712 may automatically trigger security management actions such as, e.g., shutting down devices, stopping or restricting certain types of network communication, raising alerts to system administrators, changing a security policy level, and so forth. The security console 712 may also accept instructions from a human operator to manually trigger certain security actions in view of analysis of the anomalous host. The security console 712 can therefore issue commands to the other computer systems on the network using the network interface 706.

Figure 8:
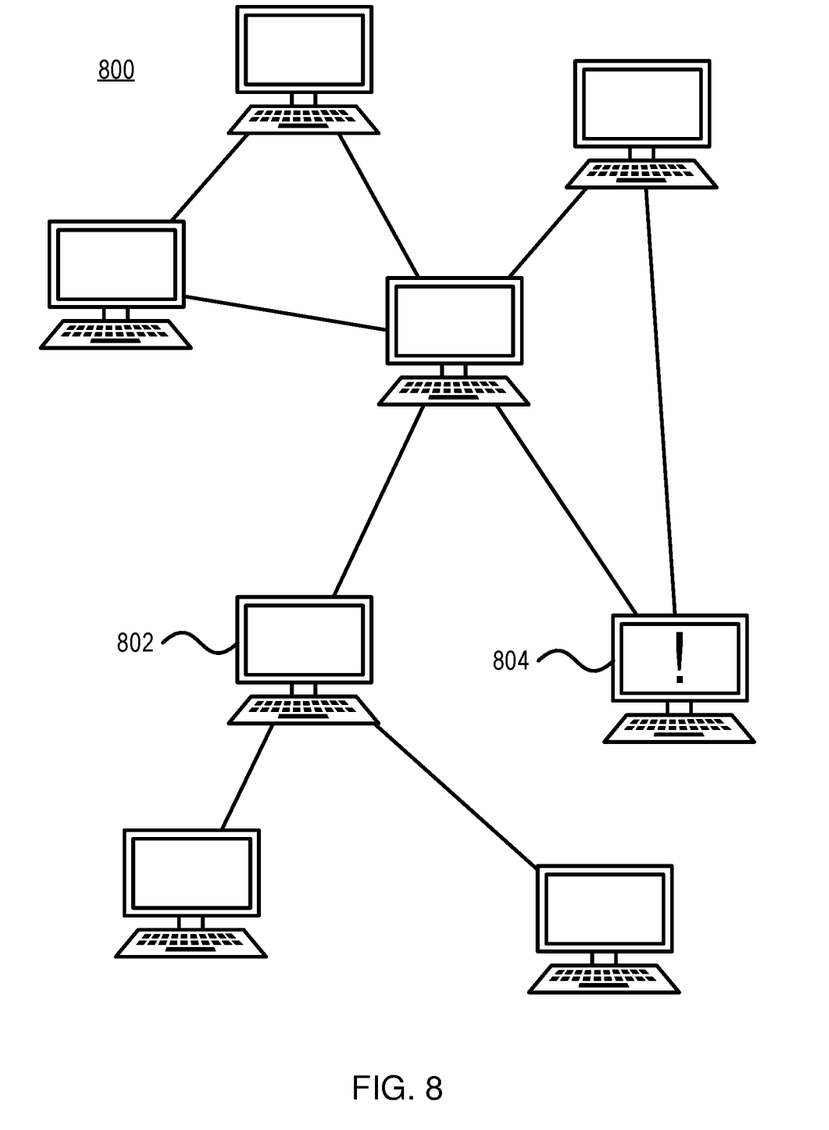
FIG. 8 is a diagram of an exemplary computer network, including at least one system that shows anomalous activity, in accordance with an embodiment of the present invention.

Referring now to FIG. 8, an embodiment is shown that includes a network 800 of different computer systems 802. The functioning of these computer systems 802 can correspond to the labels of nodes in a network graph that identifies the topology and the attributes of the computer systems 802 in the network. At least one anomalous computer system 804 can be identified using these labels, for example using the labels to identify normal operation and anomalous operation. In such an environment, the computer network security system 600 can identify and quickly address the anomalous behavior, stopping an intrusion event or correcting abnormal behavior, before such activity can spread to other computer systems.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting and responding to anomalous nodes in a network, comprising:
    inferring temporal factors, using a computer-implemented neural network, that represent changes in a network graph across a plurality of time steps, with a temporal factor for each time step depending on a temporal factor for a previous time step;
    inferring an invariant factor that represents information about the network graph that does not change across the plurality of time steps;
    combining the temporal factors and the invariant factor into a combined temporal-invariant representation;
    determining that an unlabeled node is anomalous, based on the combined temporal-invariant representation; and
    performing a security action responsive to the determination that unlabeled node is anomalous.

2. The method of claim 1, further comprising aggregating neighbors of the unlabeled node in the network graph at each of the plurality of time steps.

3. The method of claim 2, wherein aggregating neighbors of the unlabeled node comprises determining neighbors within k hops of the unlabeled node.

4. The method of claim 2, wherein inferring the temporal factors and inferring the invariant factor each operate on the aggregated neighbors of each unlabeled node.

5. The method of claim 1, wherein inferring the temporal factors uses a Markovian model that bases each temporal factor on a temporal factor at a previous time step.

6. The method of claim 5, wherein a temporal factor at a first time step is based on a previous time step temporal factor of zero.

7. The method of claim 1, further comprising combining the temporal factors together into a combined temporal representation using an attentive temporal aggregator that assigns different levels of attention to different sub-sequences.

8. The method of claim 1, wherein the invariant factor is based on features of all of the plurality of time steps in the network graph.

9. The method of claim 1, wherein the security action is selected from the group consisting of shutting down devices, stopping or restricting a type of network communication, enabling or disabling a connection between two devices, raising an alert to a system administrator, and changing a security policy level.

10. A system for detecting and responding to anomalous nodes in a network, comprising:
    a hardware processor;
    a memory, configured to store a temporal graph factorization network that is executed by the processor, wherein the temporal graph factorization network is configured to infer temporal factors that represent changes in a network graph across a plurality of time steps, with a temporal factor for each time step depending on a temporal factor for a previous time step, to infer an invariant factor that represents information about the network graph that does not change across the plurality of time steps, to combine the temporal factors and the invariant factor into a combined temporal-invariant representation, and to determine that an unlabeled node is anomalous, based on the combined temporal-invariant representation; and
    a security console, configured to perform a security action responsive to the determination that unlabeled node is anomalous.

11. The system of claim 10, wherein the temporal graph factorization network is further configured to aggregate neighbors of the unlabeled node in the network graph at each of the plurality of time steps.

12. The system of claim 11, wherein the temporal graph factorization network is further configured to determine neighbors within k hops of the unlabeled node.

13. The system of claim 11, wherein the temporal graph factorization network is further configured to infer the temporal factors and to infer the invariant factor based on the aggregated neighbors of each unlabeled node.

14. The system of claim 10, wherein the temporal graph factorization network is further configured to infer the temporal factors using a Markovian model that bases each temporal factor on a temporal factor at a previous time step.

15. The system of claim 14, wherein a temporal factor at a first time step is based on a previous time step temporal factor of zero.

16. The system of claim 10, wherein the temporal graph factorization network is further configured to combine the temporal factors together into a combined temporal representation using an attentive temporal aggregator that assigns different levels of attention to different sub-sequences.

17. The system of claim 10, wherein the invariant factor is based on features of all of the plurality of time steps in the network graph.

18. The method of claim 10, wherein the security action is selected from the group consisting of shutting down devices, stopping or restricting a type of network communication, enabling or disabling a connection between two devices, raising an alert to a system administrator, and changing a security policy level.

* * * * *